Nov. 4, 1969  D. G. NOERR, JR  3,476,418
COUPLING ARRANGEMENT

Filed Dec. 20, 1967

INVENTOR
DONALD G. NOERR, JR.
BY
Bernard J. Murphy
AGENT

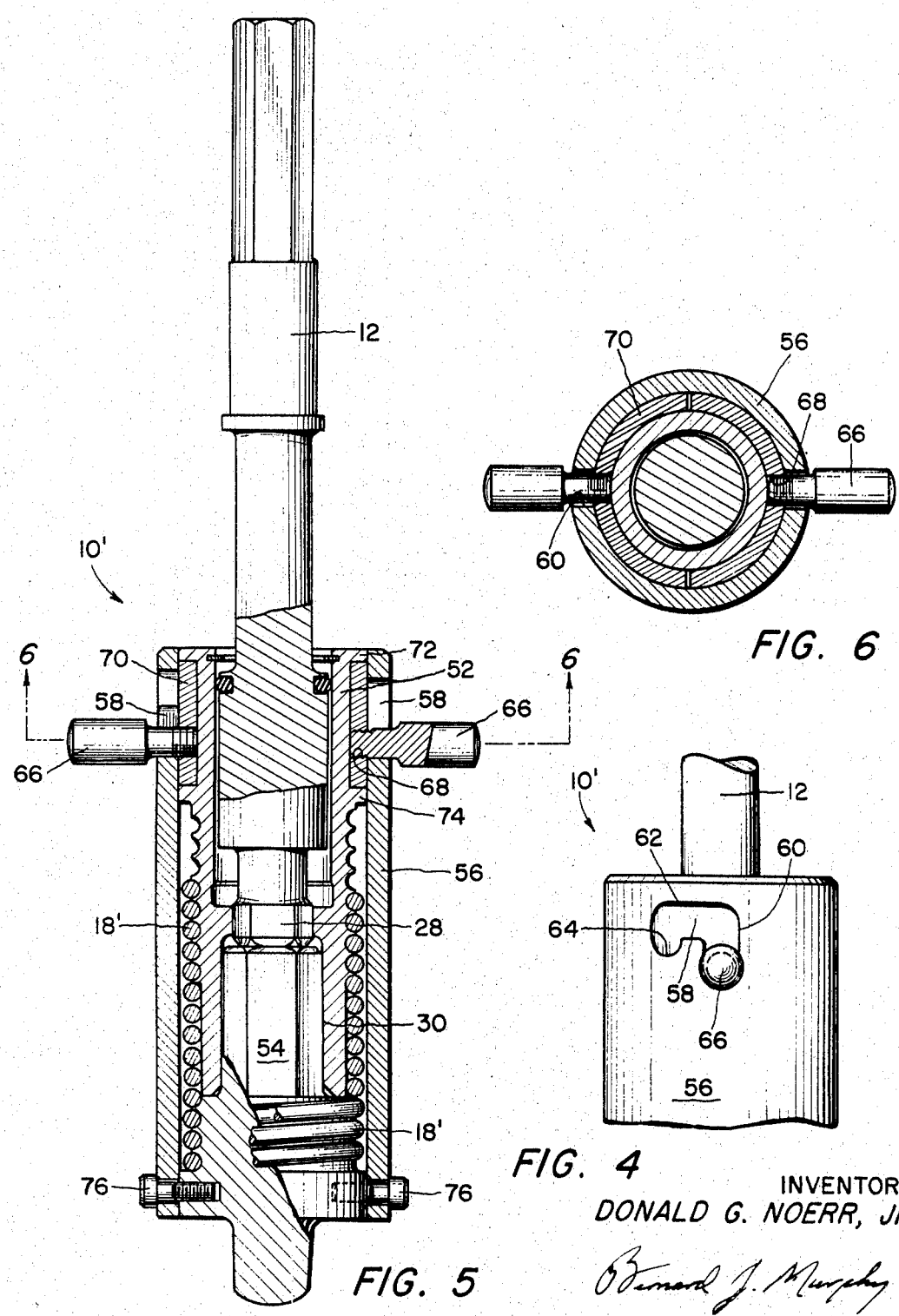

United States Patent Office 3,476,418
Patented Nov. 4, 1969

3,476,418
COUPLING ARRANGEMENT
Donald G. Noerr, Jr., South Waverly, Pa., assignor to Ingersoll-Rand Company, New York, N.Y., a corporation of New Jersey
Continuation-in-part of application Ser. No. 668,090, Sept. 15, 1967. This application Dec. 20, 1967, Ser. No. 695,823
Int. Cl. F16b 7/00; F16d 1/00
U.S. Cl. 287—108                                14 Claims

ABSTRACT OF THE DISCLOSURE

A rotary and impacting drive member, and a driven member, drive-coupled through a housing having keying surfaces mating therewith. The housing is slidably displaceable, manually, to interrupt the rotary drive.

---

This is a continuation-in-part of my co-pending application, Ser. No. 668,090, filed Sept. 15, 1967 titled "Coupling Arrangement," and now abandoned.

This invention pertains to arrangements for coupling a driving member, having a plurality of driving functions, with a driven member to impart said functions thereto, and in particular to such coupling arrangements having means for interrupting the imparting, therebetween, of at least one of said functions.

Drive coupling arrangements known in the prior art are used, for instance, to effect installation of self-drilling concrete anchors. Such known devices are used with demolition hammers. They have an impacting drive member which is coupled to a driven member; further, the two members are keyed together, and the drive member has an arm extending therefrom. Rotation is imparted to the driven member, manually, by turning the extending arm. Hand rotation, however, is awkward and slow. It would be advantageous to be able to use a rotary demolition hammer by means of which the driven member can be impacted and also simultaneously and/or recurringly rotated. However, the difficulty with this consideration, heretofore, is that there will occur, repeatedly, circumstances in which it is necessary or desirable to interrupt the rotation for given periods of time, to maintain the impacting while avoiding rotation, where the concrete is especially firm, or to start a new hole, or to set the plug in the anchor for installation, and like situations.

Clearly, all manner of complex designs might be engineered to power such interruption of rotation. But the design complexity, the number of parts, the channeling of power, and the engage-disengage switching arrangements would be of such cost, in fabrication and maintenance, as to be prohibitive in so simple an application as that contemplated by a concrete anchor drive coupling. All that is required is some simple coupling usable with a tool providing a plurality of driving functions, such as a rotary demolition tool, the coupling having an uncomplicated means for interrupting, at least, one function of said plurality, for instance, the rotary function. It is an object of this invention, therefore, to provide a simple coupling arrangement usable with a tool having a plurality of driving functions to install self-drilling concrete anchors or to drive coredrills. It is a further object of this invention to provide such a coupling arrangement having means by which one of the functions of said plurality is interruptable by uncomplicated means. Still another object of this invention is to provide a coupling of the type described wherein all functions of said plurality are inherently imparted therethrough, and having manually-operative means for interrupting one of the functions of said plurality. Another object of this invention is to provide a coupling arrangement, for driven and driving members, for communicating a plurality of driving functions therebetween, having manually translatable means for interrupting one of the driving functions and means for selectively locking one of the driving functions out of intermember communication.

A feature of this invention is the disposing of a driven member and a driving member co-linearly within a housing, the housing and the members having mating keying surfaces for imparting drive functions therebetween, and having means for displacing the housing relative to the members to disengage the mating keying surfaces to interrupt at least one of the drive functions.

Another feature of this invention comprises a locking pin and slot for selectively locking the displaceable housing in a position which interrupts intermember communication of one driving function.

Further objects and features of this invention will become more apparent by reference to the following description, taken in conjunction with the accompanying figures, in which:

FIG. 4 is a fragmentary plan view of an alternate embodiment of the invention incorporating a lock-out arrangement;

FIG. 5 is a cross-sectional view of the embodiment of FIG. 4 taken along the axial center thereof; and FIG. 6 is a cross-sectional view of the lock-out arrangement taken along section 6—6 of FIG. 5.

Figure 1:
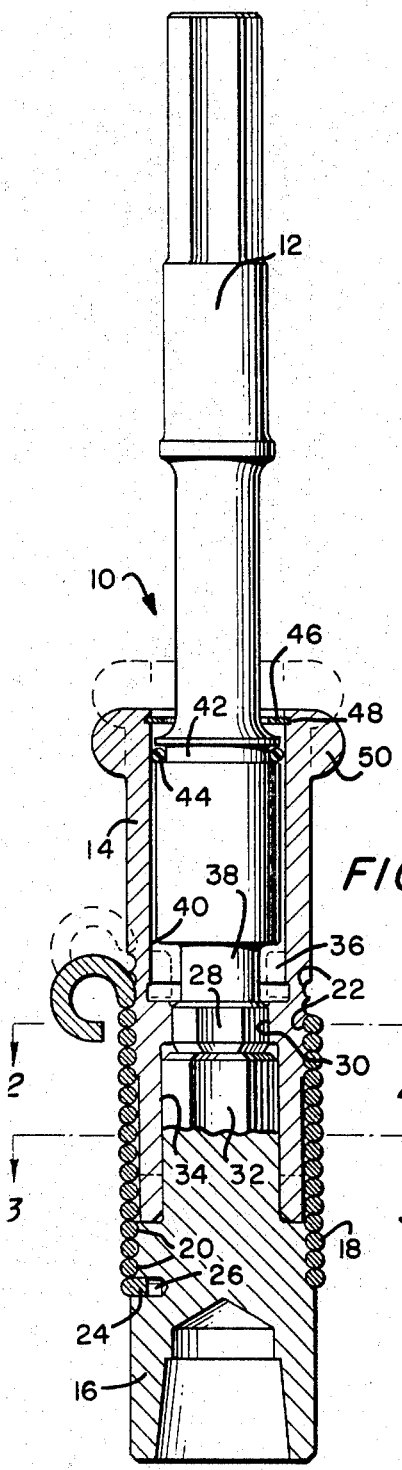
FIG. 1 is a vertical, elevational view, partly in cross-section, of the coupling arrangement according to the invention.

A first embodiment of the coupling arrangement according to my invention is shown generally, in FIG. 1, by the index numeral 10. The arangement 10 comprises a shank 12 which is coupled at one end thereof to a tool (not shown) having a plurality of drive functions, such as a rotary demolition tool, the other end of the shank 12 being received in one end of the housing 14. The opposite end of the housing 14 mounts a chuck 16 to which self-drilling concrete anchors, or the like, can be threaded or otherwise coupled. A spring 18 couples the housing 14 to the chuck 16. The spring 18 is nested in arcuate thread-seats 20 formed in the outer surface of the chuck 16, and in corresponding arcuate thread-seats 22 formed in the outer surface of housing 14. The chuck-end of the spring 18 has a tang 24 which is received in a bore 26 formed in the chuck 16 to secure that end thereat. Shank 12 has a hexagonal knob 28 formed on that end thereof which is received in housing 14. Hexagonal knob 28 mates with a hexagonal shoulder 30 formed in, and extending inwardly of, the housing 14. Chuck 16 has a hexagonal stub 32 which, likewise, is receivable in and mates with, a hexagonal-walled, inner cylinder portion 34 of the housing 14. Rearward of the hexagonal knob 28 and its interfacing hexagonal shoulder 30, i.e., toward shank 12 and away from chuck 16, there is formed a space 36. Space 36 is formed thereat between a short-length, reduced portion 38 of the shank 12 and an inner cylindrical portion 40 of the housing 14. At the terminal end of the major body portion of shank 12 there is formed an annular recess 42 for receiving O-ring seal 44. The shank 12, and O-ring seal 44 mounted thereto, are retained in the housing 14 by a retaining ring 46 set in an annular groove 48 formed the end thereof. Finally, the housing 14 has an enlarged grip portion 50 formed on the rear end thereof.

The operation of my coupling arrangement is as uncomplicated as it is novelly simple in structure. Shank 12 is joined to a tool (not shown) having a plurality of drive functions, such as impacting, rotation, and the like—a rotary demolition tool, by way of example. Inherently the plurality of drive functions are communicated through my coupling arrangement to the chuck 16.

Figure 2:
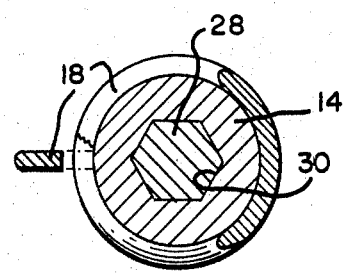
FIG. 2 is a cross-sectional view of the novel coupling arrangement taken along section 2—2 of FIG. 1.

Impacting of shank 12 is imparted to chuck 16 via the interfacing of the ends of both. Rotation is imparted through mating, hexagonal "driving" surfaces of hexagonal knob 28 and hexagonal shoulder 30, whereby the housing 14 is rotationally driven. These "driving" surfaces are best seen in FIG. 2. Accordingly, housing rotation is further imparted through mating, hexagonal "driven" surfaces of inner cylinder portion 34 and hexagonal stub 32. The "driven" surfaces are best seen in FIG. 3.

This preferred embodiment of my invention teaches the use of hexagonal "driving" and "driven" surfaces on the communicating members 28 and 30, and 34 and 32. Patently the surfaces could be of other geometric configuration, or the surfaces could be interrelatedly keyed, or splined, to communicate drive therebetween, without departing from the spirit of my invention.

Spring 18 serves to maintain shoulder 30 about hexagonal knob 28. Accordingly, when it is desired to prohibit the rotation of chuck 16 it remains only to grasp the housing 14 about the enlarged grip portion 50 and retract it rearwardly against the bias of the spring 18. In so doing, hexagonal shoulder 30 will be displaced from hexagonal knob 28 and will be disposed, then, in space 36. This retracted positioning of housing 14 is represented in FIGURE 1 in dashed outline. As the dashed outline in FIG. 1 clearly indicates, shank 12 and hexagonal knob 28 can continue to rotate, but the rotation of hexagonal knob 28 is not then communicable. The interfacing ends of chuck 16 and shank 12 remain in tangency. Therefore, impacting of chuck 16 by shank 12 can continue. Rotation of chuck 16 will have been interrupted, and will remain so until housing 14 is released, allowed to respond to spring 18 and cause a resumption of the keying engagement of hexagonal shoulder 30 with hexagonal knob 28.

Figure 3:
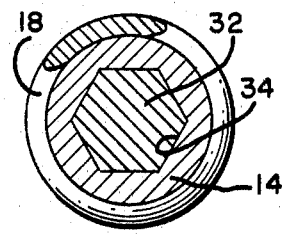
FIG. 3 is a cross-sectional view of the coupling arrangement taken along section 3—3 of FIG. 1.

FIGS. 4, 5, and 6 illustrate an alternate embodiment of my invention in which same or similar index numbers denote same or similar components as compared to components in the first embodiment of FIGS. 1, 2, and 3.

The alternate embodiment of my invention teaches a means for translating a housing, relative the driving and driven members, to interrupt the communication therebetween of a driving function, and means for selectively locking the housing in the "interrupt" position.

As shown in a fragmentary view in FIG. 4 and cross-section in FIG. 5, the alternate coupling arrangement 10' comprises a shank 12 received in one end of housing 52. The opposite end of the housing receives a chuck 54. A cylindrical shell 56 envelopes the driving member, shank 12, driven member, chuck 54, coupling spring 18', housing 52, and a sleeve of which more will be said subsequently. Shell 56 accommodates the means for locking the housing 52 in rotation disengagement position.

Shell 56 has formed therethrough a pair of oppositely disposed, right-angular slots 58. One leg 60 of slots 58 is parallel with the longitudinal axis of the coupling arrangement. The other leg 62 is transverse to said axis, and has formed in an end thereof furtherest from leg 60 an arcuate detent recess 64. Recess 64 extends from leg 62 toward the chuck end of the coupling arrangement. Slots 58 are provided to receive therethrough a pair of finger grips 66. Finger grips 66 are oppositely disposed and extend perpendicularly from housing 52. Each grip 66 comprises a longitudinal member having an enlarged diameter portion on one end and a smaller-diameter, shank portion on the other end. The shank portion is threadedly received in a tapped bore 68 (FIGS. 5 and 6) formed in a two-part cylindrical sleeve 70 which is concentric with housing 52.

Housing 52 has a pair of external, circumferential and spaced radial shoulders 72 and 74. These shoulders form therebetween a wide-girth recess in which the two-part cylindrical sleeve 70 is received, enclosed by shell 56. Machine screws 76 secure the shell 56 to the chuck 54.

The alternate embodiment is operated in the same manner as the embodiment of FIGS. 1, 2, and 3, however it has a further facility for locking the housing 52 in the rotation-interrupt position. By grasping the finger grips 66 and pulling them away from the chuck end of the coupling arrangement, knob 28 and shoulder 30 are separated. Rotary drive is interrupted. Also, the shank portions of grips 66 traverse legs 60 of slots 58. Then, by turning the sleeve 70, by means of finger grips 66, about the longitudinal axis of the coupling arrangement, the shank portions of grips 66 traverse legs 62 of slots 58. If the grips 66 are then released, the shank portions of the grips will nest in the recesses 64. Thus is the coupling arrangement locked in the rotation-interrupt position.

As is self-evident from FIG. 5, two-part sleeve 70 and housing 52 are resiliently urged toward chuck 54 by the bias of spring 18'. Accordingly, knob 28 and shoulder 30 normally engage to communicate a rotational torque therebetween. When finger grips 66 are used to interrupt the rotational communication, they overcome the bias of spring 18'. The longitudinal pulling of the finger grips 66 causes sleeve 70 to exert a force against shoulder 72, thereby displacing housing 52 in the same direction. When finger grips 66 are then radially rotated, housing 52, shell 56, and chuck 54 are not displaced radially.

The teaching of my invention, therefore, is of a simple coupling usable with a tool providing a plurality of driving functions, with uncomplicated means for interrupting one of the functions, that the tool might be used to install self-drilling, concrete anchors, or to drive core drills, and similar usages. Further, my invention teaches a means for selectively locking out one of the driving functions. With respect to the use of my novel coupling with a tool to drive core drills, an especial advantage is realized. Disengagement of the rotation can be used to start the core drill, to keep the latter from "walking" on the concrete surface, thereby accurately locating the hole; this facility eliminates the need for starter drills which must be removed before the core drill can be applied as has been the customary practice in the field prior to the teaching of my invention.

While I have described my invention in connection with particular embodiments, it is to be clearly understood that this is done only by way of example and not as a limitation to the scope of my invention as set forth in the objects thereof and in the accompanying claims.

I claim:

1. A coupling arrangement, for use with drive means having a plurality of driving functions, comprising:
   a driving member for attachment to said drive means;
   a driven member;
   first means coupled to said members for disposing said members in adjacency, said first means being disposed for manual translation, relative said members, between first and second positions; and
   second means for disposing given surfaces of one of said members and said first means in conjunctive relationship for causing all driving functions of said plurality to be imparted via said driving member to said driven member only upon disposition of said first means in said first position; and wherein;
   said one member has a relieved portion formed in and along a surface thereof, said relieved portion being cooperative with said first means to define a spatial area, between said one member and said first means, to receive said given surfaces of said first means therein.

2. The invention, according to claim 1, wherein:
   said second means comprise means for disposing said given surfaces of said one member and said first means in non-conjunctive relationship for causing an interruption of the imparting of at least one of said driving functions to said driven member via said driving member.

3. The invention, according to claim 1, wherein:
said first means comprise a cylindrical member, and at least one of said driving and driven members is co-axially disposed relative said cylindrical member.

4. The invention, according to claim 3, wherein:
said given surfaces include a first plurality of angularly disposed surfaces formed of said cylindrical member transverse to the axis thereof; and
a second plurality of angularly disposed surfaces formed of said one member.

5. The invention, according to claim 1, wherein:
said first means comprises a cylindrical member, and said driving and driven members are co-axially disposed relative said cylindrical member.

6. The invention, according to claim 1, wherein:
said first means disposes said members in co-linear attitude.

7. The invention, according to claim 1, wherein:
said second means comprises a spring attached to said first means and one of said members.

8. The invention, according to claim 7, wherein:
said spring is attached to said first means and to said driven member.

9. The invention, according to claim 1, further comprising:
means cooperative with said first means for selectively locking said first means in said second position, to interrupt communication of one of said driving functions with said driven member.

10. The invention, according to claim 9, wherein:
said locking means comprise latching means disposed immediately adjacent said first means for facilitating said manual transaltion and for restraining said first means in said second position.

11. The invention, according to claim 10, wherein:
said latching means comprise a sleeve and a cylindrical shell, both being concentric with said members and said first means;
said shell having angulated slotting formed therethrough; and
said sleeve carrying followers for movement along said slotting to dispose said sleeve in correspondence with said first and second positions.

12. The invention, according to claim 11, wherein:
said sleeve and said first means having abutting surfaces which cause said first means to assume said first and second positions with movement of said followers along said slotting.

13. The invention, according to claim 11, wherein:
said slotting includes a detentive recess for nesting said followers therein to restrain said sleeve in a disposition corresponding with said second position.

14. The invention, according to claim 1, wherein:
said second means comprise resilient means, coupled to said first means and one of said members, to constrain said first means in said first position.

References Cited

UNITED STATES PATENTS

| | | | |
|---|---|---|---|
| 2,894,775 | 7/1959 | Harless | 287—108 |
| 3,370,655 | 2/1968 | Chromy | 192—67 XR |

FOREIGN PATENTS 189,612  12/1922  Great Britain.

DAVID J. WILLIAMOWSKY, Primary Examiner

A. V. KUNDRAT, Assistant Examiner

U.S. Cl. X.R.

173—104